R. Stilwell,

Bed Bottom,

No. 2,742, Reissued Aug. 20, 1867.

Witnesses.
Wm. F. McNamara
Theo. Tusch

Inventor
R. Stilwell

N. PETERS, PHOTO-LITHOGRAPHER, WASHINGTON, D. C.

United States Patent Office

R. STILWELL AND A. D. FARRELL, OF NEW YORK, N. Y., ASSIGNEES OF R. STILWELL.

*Letters Patent No.* 44,975, *dated September* 20, 1864; *reissue No.* 2,742, *dated August* 20, 1867.

IMPROVED SPRING-MATTRESS.

The Schedule referred to in these Letters Patent and making part of the same.

TO ALL WHOM IT MAY CONCERN:

Be it known that I, R. STILWELL, of the city, county, and State of New York, have invented a new and improved Spring-Mattress; and we, R. STILWELL and ALEXANDER D. FARRELL, assignees of said STILWELL, of the same place, do hereby declare that the following is a full, clear, and exact description thereof, which will enable those skilled in the art to make and use the same, reference being had to the accompanying drawings, forming part of this specification, in which—

Similar letters of reference indicate corresponding parts.

The object of this invention is to produce a spring-mattress with stuffing, which can be conveniently folded in such a manner that the mattress when folded will be enclosed and protected by the parts or sections which compose the frame.

Figure 1:
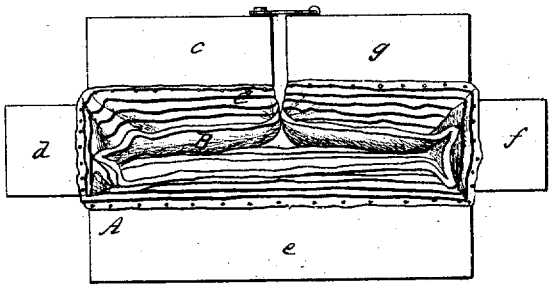
Figure 1 represents a side elevation of my invention when folded.
Figure 2:
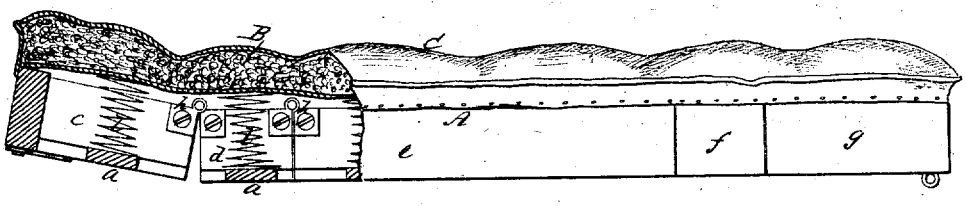
Figure 2 is a sectional side elevation of the same when unfolded.

A represents the frame of my mattress, which is made of wood, or any other suitable material, and provided with bottom slats, *a*, to support the springs *b*. The frame A is covered with the stuffing or mattress B, which is retained by the tick C, which is secured to the sides of the frame in the ordinary manner. The frame A is to be divided into convenient sections, such as *c d e f g*, hinged together for the purpose of compact folding. Those of the sections that fold horizontally (as, for example, the sections *c e g*, fig. 1,) are so hinged that the said horizontal sections are separated when folded by a space about equal to twice the thickness of the stuffing B of the mattress, so that the parts of the mattress will fold upon each other, as shown in fig. 1, and will be enclosed between and protected by the sections when folded. The separation of the horizontal sections is effected by the combination therewith, and with the mattress at the fold thereof, of a smaller section, which latter also covers and protects the fold of the mattress, as shown in fig. 1. When the mattress is extended, as shown in fig. 2, the head section may be conveniently elevated.

The tick or case C, which encloses and confines the stuffing, is secured to the upper edges of the frame A.

Figure 3:
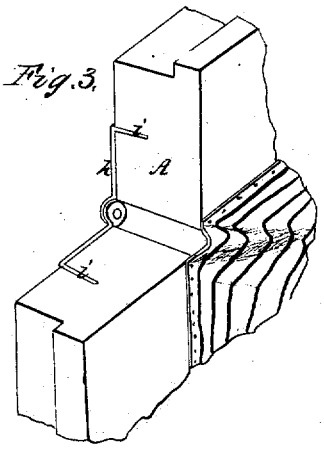
Figure 3 is a detached perspective view of the hinge on a larger scale than the previous figures.

The hinges *h*, which we use to secure the various sections of the frame together, are provided with lips *i* to catch into kerfs cut into the side rails of the frame, as clearly shown in fig. 3. By these means the hinges are prevented from turning round, and one screw in each part is sufficient to retain the same firmly in its place.

Having thus described this invention, what we claim as new, and desire to secure by Letters Patent, is—

1. Hinging together the sections containing the springs, substantially as herein shown and described, so that the folded horizontal sections thereof shall have a separation of about twice the thickness of the mattress, all as set forth.

2. The combination, with the mattress at the folds thereof and with the horizontal sections, of an end section, substantially as and for the purpose herein shown and described.

3. The catching lips *i*, in combination with the hinges, substantially as herein shown and described.

R. STILWELL,
A. D. FARRELL.

Witnesses:
WM. F. MCNAMARA,
C. L. TOPLIFF.